US009258694B2

(12) United States Patent
Palin et al.

(10) Patent No.: US 9,258,694 B2
(45) Date of Patent: Feb. 9, 2016

(54) METHOD, APPARATUS, AND COMPUTER PROGRAM PRODUCT FOR WIRELESS DEVICE DISCOVERY PROCESS

(71) Applicant: Nokia Corporation, Espoo (FI)

(72) Inventors: Arto Palin, Viiala (FI); Jukka Reunamäki, Tampere (FI)

(73) Assignee: Nokia Technologies Oy, Espoo (FI)

( * ) Notice: Subject to any disclaimer, the term of this patent is extended or adjusted under 35 U.S.C. 154(b) by 369 days.

(21) Appl. No.: 13/747,836

(22) Filed: Jan. 23, 2013

(65) Prior Publication Data

US 2014/0206286 A1  Jul. 24, 2014

(51) Int. Cl.
*H04B 7/00* (2006.01)
*H04W 8/00* (2009.01)

(52) U.S. Cl.
CPC .................... *H04W 8/005* (2013.01)

(58) Field of Classification Search
CPC . H04W 8/005; H04W 84/20; H04W 28/0226; H04W 40/24; H04W 48/16; H04W 24/00; H04W 48/08; H04W 84/18
USPC ........................................ 455/41.2
See application file for complete search history.

(56) References Cited

U.S. PATENT DOCUMENTS

| 7,775,432 | B2 | 8/2010 | Jalkanen et al. |
| 2007/0141985 | A1 | 6/2007 | Parkkinen et al. |
| 2013/0136033 | A1* | 5/2013 | Patil ............... H04W 84/18 370/255 |
| 2014/0082185 | A1* | 3/2014 | Abraham ......... H04W 24/00 709/224 |
| 2014/0133584 | A1* | 5/2014 | Su ................. H04B 5/0031 375/256 |

FOREIGN PATENT DOCUMENTS

| WO | WO 2012127095 | 9/2012 |
| WO | WO 2013083868 | 6/2013 |

* cited by examiner

*Primary Examiner* — Ajibola Akinyemi
(74) *Attorney, Agent, or Firm* — Locke Lord LLP

(57) ABSTRACT

Method, apparatus, and computer program product example embodiments enhance wireless communications device discovery processes. In an example embodiment, a method includes detecting a wireless device discovery message at an apparatus, and in response to detecting the wireless device discovery message, temporarily tuning, by the apparatus, device discovery parameters to increase a rate of detecting wireless device discovery messages.

15 Claims, 9 Drawing Sheets

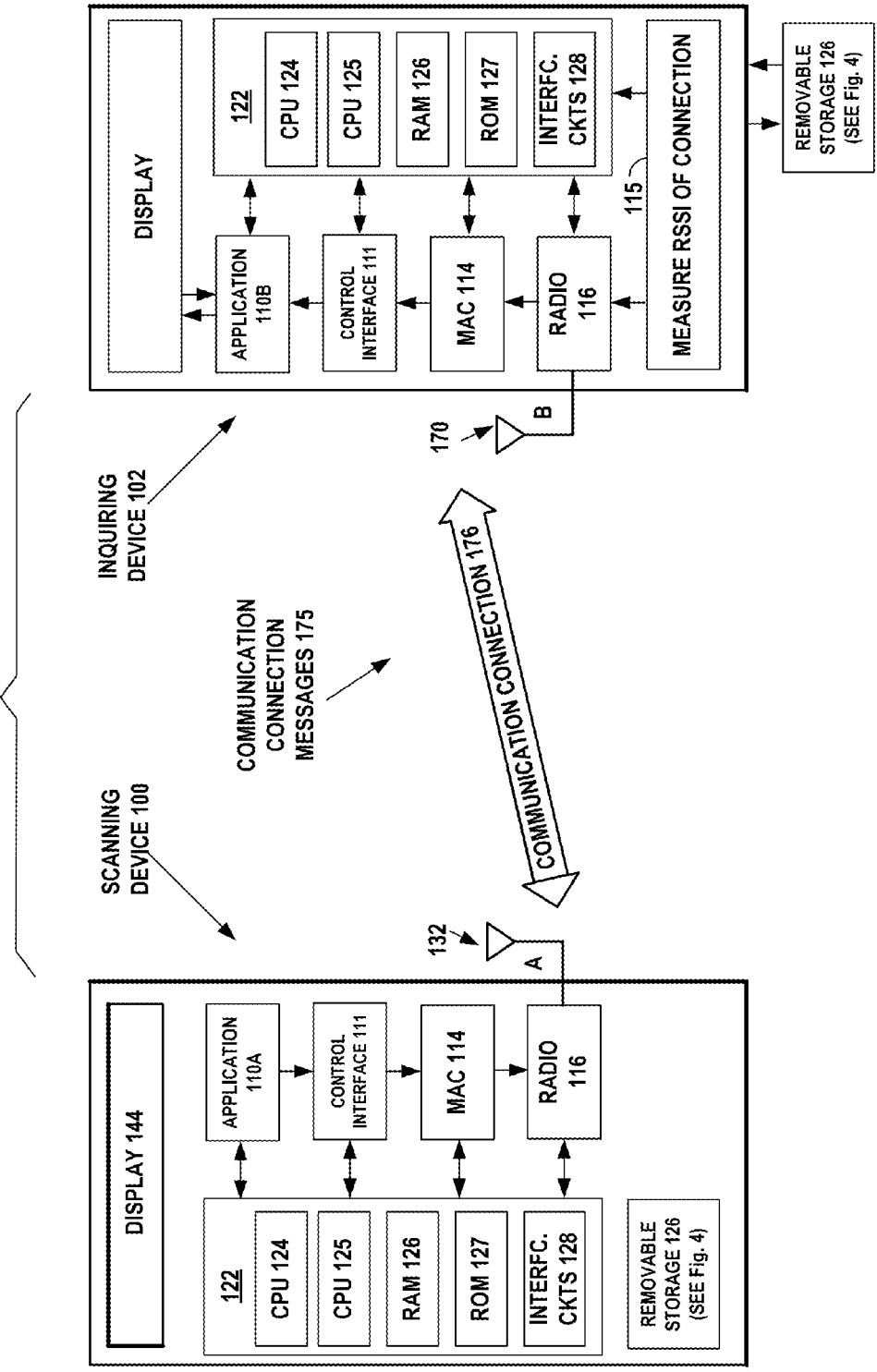

PROCESS IN SCANNING DEVICE 100

180

STEP 182: DETECTING A WIRELESS DEVICE DISCOVERY MESSAGE AT AN APPARATUS; AND

STEP 184: IN RESPONSE TO DETECTING THE WIRELESS DEVICE DISCOVERY MESSAGE, TEMPORARILY TUNING, BY THE APPARATUS, DEVICE DISCOVERY PARAMETERS TO INCREASE A RATE OF DETECTING WIRELESS DEVICE DISCOVERY MESSAGES.

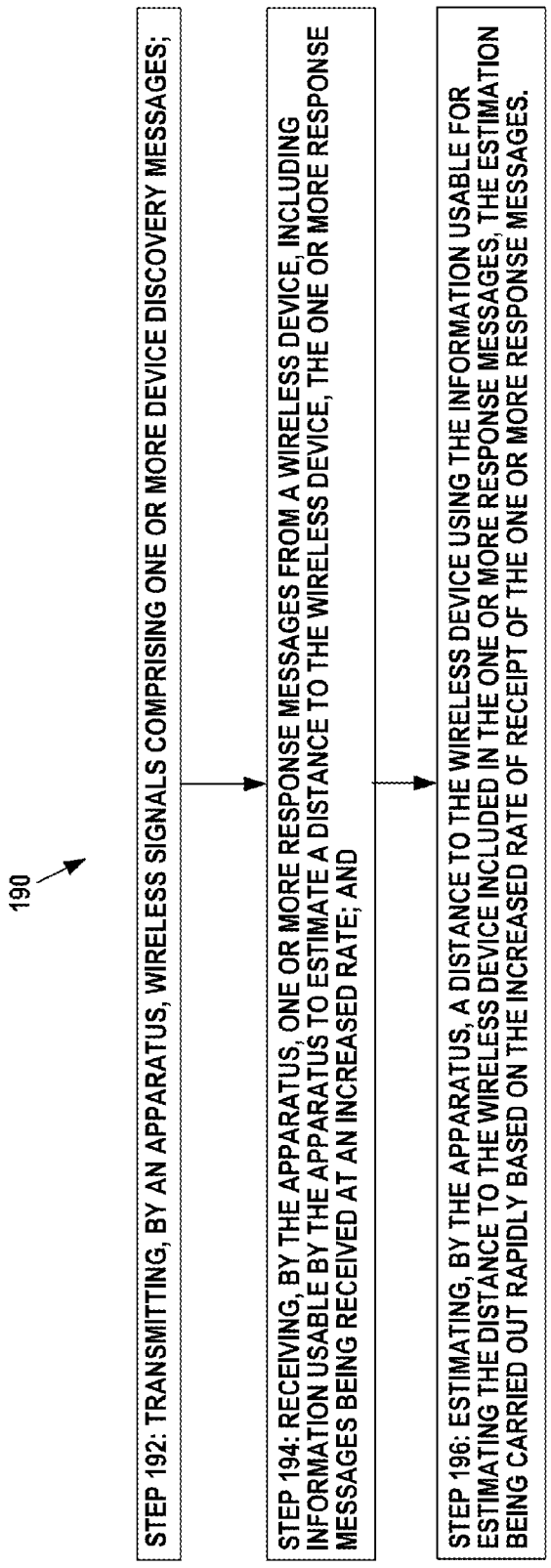

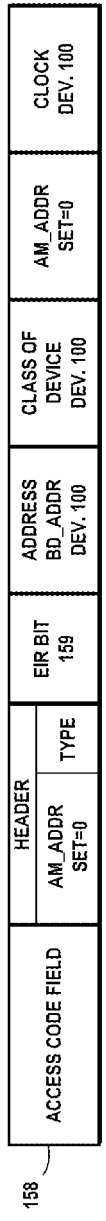
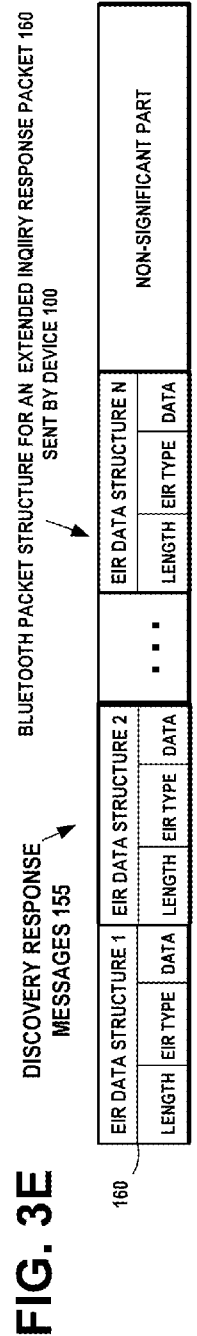
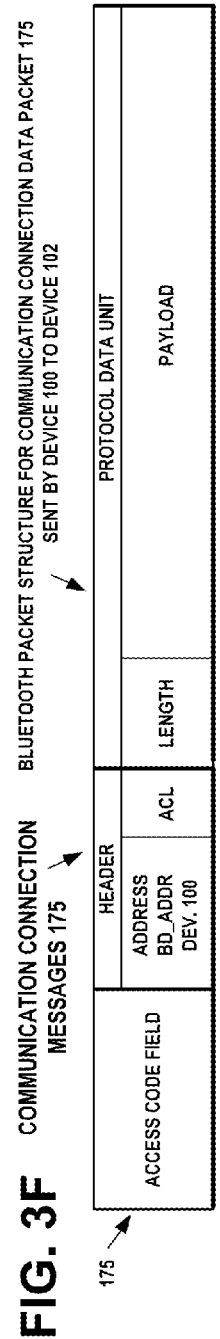

METHOD, APPARATUS, AND COMPUTER PROGRAM PRODUCT FOR WIRELESS DEVICE DISCOVERY PROCESS

FIELD

The technology field relates to controlling device discovery process based on received discovery messages.

BACKGROUND

Modern society has adopted, and is becoming reliant upon, wireless communication devices for various purposes, such as, connecting users of the wireless communication devices with other users. Wireless communication devices can vary from battery powered handheld devices to stationary household and/or commercial devices utilizing electrical network as a power source. Due to rapid development of the wireless communication devices a number of areas capable of enabling entirely new types of communication applications have emerged.

An example of a wireless short-range communication technology is Bluetooth™ communication protocol, which operates in the 2.4 GHz ISM band. Bluetooth™ is a short-range radio network, originally intended as a cable replacement. Bluetooth™ Technical Specifications are published by the Bluetooth™ SIG, Inc. Bluetooth™ *Specification version 2.0+EDR*, published Oct. 15, 2004 has the original functional characteristics of the first version Bluetooth™ Basic Rate (BR) and adds the Enhanced Data Rate (EDR) feature. Bluetooth™ *Specification version 2.1+EDR*, published Jul. 26, 2007 for Basic Rate/Enhanced Data Rate (BR/EDR), added definitions for new features: Encryption Pause Resume, Erroneous Data reporting, Extended Inquiry Response, Link Supervision Timeout Event, Packet Boundary Flag, Secure Simple Pairing, Sniff Subrating. Bluetooth™ *Specification version 3.0+HS*, published Apr. 21, 2009, updated the standard to integrate the Alternate MAC/PHY and Unicast Connectionless Data features.

The Bluetooth™ *Core Specification, Version* 4.0, Bluetooth™ SIG, Jun. 30, 2010 (incorporated herein by reference), includes the Extended Inquiry Response. An Extended Inquiry Response may be used to provide miscellaneous information during the inquiry response procedure. Data types may be defined for such things as local name and supported services, information that otherwise would have to be obtained by establishing a connection. A device that receives a local name and a list of supported services in an extended inquiry response does not have to connect to do a remote name request and a service discovery protocol (SDP) service search, thereby shortening the time to useful information.

SUMMARY

Method, apparatus, and computer program product example embodiments enhance wireless communications device discovery processes.

An example embodiment of the invention includes a method comprising:

detecting a wireless device discovery message at an apparatus; and in response to detecting the wireless device discovery message, temporarily tuning, by the apparatus, device discovery parameters to increase a rate of detecting wireless device discovery messages.

An example embodiment of the invention includes a method comprising:

determining, by the apparatus, that the wireless device discovery message meets a predefined criterion to temporarily tune the device discovery parameters to increase the rate of detecting wireless device discovery messages;

wherein the predefined criterion comprises at least one of a received signal strength indication of the wireless device discovery message exceeding a threshold value, an interval since a previous increase in the rate of detecting a wireless device discovery message is greater than a first threshold interval, an interval since detecting a previous wireless device discovery message is less than a second threshold duration, and a predetermined number of previously detected one or more wireless device discovery messages is less than a threshold number.

An example embodiment of the invention includes a method comprising:

wherein the apparatus tunes the device discovery parameters to increase the rate of detecting wireless device discovery messages by at least one of reducing an inquiry scan interval, increasing an inquiry scan window, and performing interlaced inquiry scanning.

An example embodiment of the invention includes a method comprising:

wherein the apparatus tunes the device discovery parameters to increase the rate of detecting wireless device discovery messages for a predetermined time period after receipt of the wireless device discovery message.

An example embodiment of the invention includes a method comprising:

transmitting, by the apparatus, in response to detecting the wireless device discovery message, one or more wireless response messages usable for a wireless device receiving the one or more wireless response messages, to estimate a distance to the apparatus, the one or more wireless response messages including at least one of a received signal strength indication of the wireless device discovery message and an indication that the apparatus and the wireless device are in close proximity with each other.

An example embodiment of the invention includes a method comprising:

decreasing, by the apparatus, the rate of detecting the wireless device discovery messages in response to at least one of a received signal strength indication of the wireless device discovery message decreases below a threshold value, an interval since a previous increase in the rate of detecting wireless device discovery messages is less than a first threshold interval, an interval since detecting a previous wireless device discovery message is greater than a second threshold interval, and a predetermined number of previously detected wireless device discovery messages is greater than a threshold number.

An example embodiment of the invention includes an apparatus comprising:

at least one processor;

at least one memory including computer program code;

the at least one memory and the computer program code configured to, with the at least one processor, cause the apparatus at least to:

detect a wireless device discovery message; and in response to detecting the wireless device discovery message, temporarily tune device discovery parameters to increase a rate of detecting wireless device discovery messages.

An example embodiment of the invention includes an apparatus comprising:

the at least one memory and the computer program code configured to, with the at least one processor, cause the apparatus at least to:

determine that the wireless device discovery message meets a predefined criterion to temporarily tune the device discovery parameters to increase the rate of detecting wireless device discovery messages;

wherein the predefined criterion comprises at least one of a received signal strength indication of the wireless device discovery message exceeding a threshold value, an interval since a previous increase in the rate of detecting a wireless device discovery message is greater than a first threshold interval, an interval since detecting a previous wireless device discovery message is less than a second threshold duration, and a predetermined number of previously detected one or more wireless device discovery messages is less than a threshold number.

An example embodiment of the invention includes an apparatus comprising:

wherein the apparatus tunes the device discovery parameters to increase the rate of detecting wireless device discovery messages by at least one of reducing an inquiry scan interval, increasing an inquiry scan window, and performing interlaced inquiry scanning.

An example embodiment of the invention includes an apparatus comprising:

wherein the apparatus tunes the device discovery parameters to increase the rate of detecting wireless device discovery messages for a predetermined time period after receipt of the wireless device discovery message.

An example embodiment of the invention includes an apparatus comprising:

the at least one memory and the computer program code configured to, with the at least one processor, cause the apparatus at least to:

transmit, in response to detecting the wireless device discovery message, one or more wireless response messages usable for a wireless device receiving the one or more wireless response messages, to estimate a distance to the apparatus, the one or more wireless response messages including at least one of a received signal strength indication of the wireless device discovery message and an indication that the apparatus and the wireless device are in close proximity with each other.

An example embodiment of the invention includes an apparatus comprising:

the at least one memory and the computer program code configured to, with the at least one processor, cause the apparatus at least to:

decrease the rate of detecting the wireless device discovery messages in response to at least one of a received signal strength indication of the wireless device discovery message decreases below a threshold value, an interval since a previous increase in the rate of detecting wireless device discovery messages is less than a first threshold interval, an interval since detecting a previous wireless device discovery message is greater than a second threshold interval, and a predetermined number of previously detected wireless device discovery messages is greater than a threshold number.

An example embodiment of the invention includes a computer program product comprising computer executable program code recorded on a computer readable, non-transitory storage medium, the computer executable program code comprising:

code for detecting a wireless device discovery message at an apparatus; and code for, in response to detecting the wireless device discovery message, temporarily tuning, by the apparatus, device discovery parameters to increase a rate of detecting wireless device discovery messages.

An example embodiment of the invention includes a computer program product comprising:

code for determining, by the apparatus, that the wireless device discovery message meets a predefined criterion to temporarily tune the device discovery parameters to increase the rate of detecting wireless device discovery messages;

wherein the predefined criterion comprises at least one of a received signal strength indication of the wireless device discovery message exceeding a threshold value, an interval since a previous increase in the rate of detecting a wireless device discovery message is greater than a first threshold interval, an interval since detecting a previous wireless device discovery message is less than a second threshold duration, and a predetermined number of previously detected one or more wireless device discovery messages is less than a threshold number.

An example embodiment of the invention includes a computer program product comprising:

wherein the apparatus tunes the device discovery parameters to increase the rate of detecting wireless device discovery messages by at least one of reducing an inquiry scan interval, increasing an inquiry scan window, and performing interlaced inquiry scanning.

An example embodiment of the invention includes a computer program product comprising:

wherein the apparatus tunes the device discovery parameters to increase the rate of detecting wireless device discovery messages for a predetermined time period after receipt of the wireless device discovery message.

An example embodiment of the invention includes a computer program product comprising:

code for transmitting, by the apparatus, in response to detecting the wireless device discovery message, one or more wireless response messages usable for a wireless device receiving the one or more wireless response messages, to estimate a distance to the apparatus, the one or more wireless response messages including at least one of a received signal strength indication of the wireless device discovery message and an indication that the apparatus and the wireless device are in close proximity with each other.

An example embodiment of the invention includes a computer program product comprising:

code for decreasing, by the apparatus, the rate of detecting the wireless device discovery messages in response to at least one of a received signal strength indication of the wireless device discovery message decreases below a threshold value, an interval since a previous increase in the rate of detecting wireless device discovery messages is less than a first threshold interval, an interval since detecting a previous wireless device discovery message is greater than a second threshold interval, and a predetermined number of previously detected wireless device discovery messages is greater than a threshold number.

The resulting example embodiments enhance wireless communications device discovery processes.

DESCRIPTION OF THE FIGURES

FIG. 2C is an illustration of an example embodiment of the network of FIG. 2B, wherein the occurrence of the touch-to-select event results in the two devices establishing a connection, in accordance with at least one embodiment of the present invention.

FIG. 3B is an illustration of an example flow diagram of an example implementation of the process in the inquiring device 102, carrying out the example operations in the device discovery phase, in accordance with at least one embodiment of the present invention.

FIG. 3C is an illustration of an example message format for device discovery messages, using the Bluetooth communications standard, in accordance with at least one embodiment of the present invention.

FIG. 3D is an illustration of an example message format for discovery response messages, using the Bluetooth communications standard, in accordance with at least one embodiment of the present invention.

FIG. 3E is an illustration of an example message format for extended discovery response messages, using the Bluetooth communications standard, in accordance with at least one embodiment of the present invention.

FIG. 3F is an illustration of an example message format for communication connection messages, using the Bluetooth communications standard, in accordance with at least one embodiment of the present invention.

DISCUSSION OF EXAMPLE EMBODIMENTS OF THE INVENTION

Figure 1A:
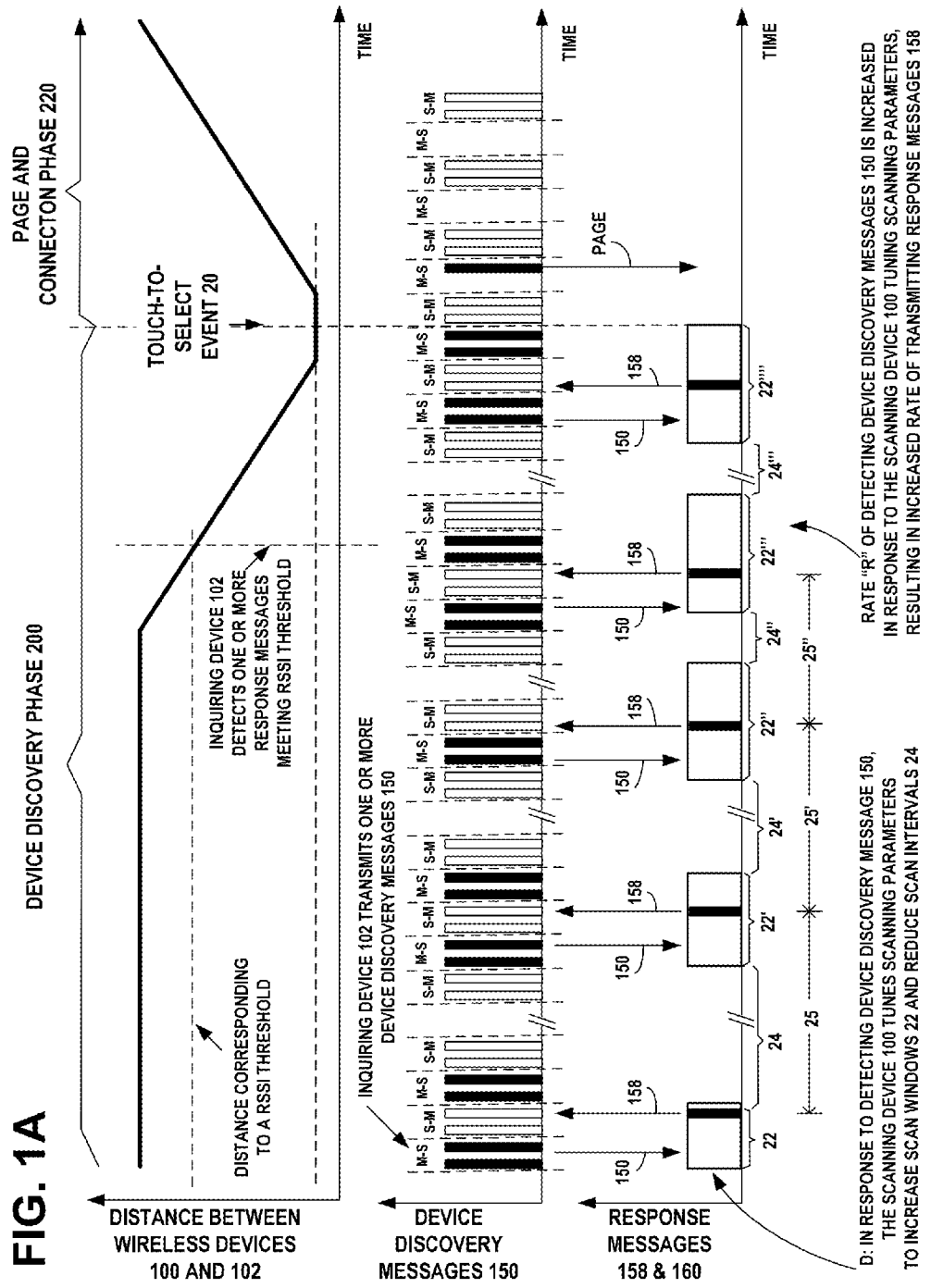
FIG. 1A is an illustration of an example timing diagram of an example sequence of operations conducted between two mobile wireless devices, wherein a scanning device receives one or more device discovery messages. After detecting a discovery message, the scanning device tunes its inquiry parameters, for example the inquiry scan interval, the inquiry scan window, or whether to do interlaced/non-interlaced scanning, which has the effect of increasing the rate of transmitting one or more response messages. The response messages include information usable for a wireless device receiving them, to estimate a distance to the scanning device, in accordance with at least one embodiment of the present invention.

This section is organized into the following topics:
A. Wireless Short-Range Communication Networks
B. Connection Formation Between Bluetooth™ Devices
C. Touch-to-Select in Bluetooth Technology
D. Bluetooth Device Discovery Process Enhancement
A. Wireless Short-Range Communication Networks Short-range communication technologies provide communication solutions appropriate for many data applications, without the cost, traffic and legislative concerns of longer-range communication technologies. Popular short-range communication technologies include Bluetooth basic rate/enhanced data rate (BR/EDR), Bluetooth Low Energy (LE), IEEE 802.11 wireless local area network (WLAN), Wireless Universal Serial Bus (WUSB), ZigBee (IEEE 802.15.4, IEEE 802.15.4a), and near field communication technologies, such as radio frequency identification (RFID) and near field communication (NFC) technology that enable contactless identification and interconnection of wireless devices. Bluetooth Technology provides an example of wireless short-range communication establishment.

B. Connection Formation Between Bluetooth™ Devices

A procedure for forming connections between Bluetooth™ devices is described in the Bluetooth™ *Specification*, Version 4, Jun. 30, 2010. The Bluetooth™ Baseband is the part of the Bluetooth™ system that implements the Media Access Control (MAC) and physical layer procedures to support the connection formation, exchange of data information streams, and ad hoc networking between Bluetooth™ devices. Connection formation may include inquiry, inquiry scanning, inquiry response, in addition to paging, page scanning, and page response procedures.

1. Inquiry

Inquiry is a procedure where a Bluetooth™ device transmits inquiry messages and listens for responses in order to discover the other Bluetooth™ devices that are within the coverage area and set discoverable. Bluetooth™ devices use the inquiry procedure to discover nearby devices, or to be discovered by devices in their locality. A Bluetooth™ device that tries to find other nearby devices is known as an inquiring device and actively sends inquiry requests. Bluetooth™ devices that are available to be found are known as discoverable devices, listen or scan for these inquiry requests, and send responses. The inquiry procedure uses dedicated physical channels for the inquiry requests and responses. The inquiry procedure does not make use of any of the architectural layers above the physical channel, although a transient physical link may be considered to be present during the exchange of inquiry and inquiry response information.

Bluetooth™ devices communicate with one another over 79 physical channels. An inquiring device wanting to discover other devices repetitively probes a first set of 16 frequencies, probing two frequencies every 625 microseconds. It repeats this at least 256 times. Then, it repetitively probes a second set of 16 frequencies. The inquiring device will repeat entire cycle at least two times. Of the 79 radio carriers, 32 are considered wake-up carriers and the inquiring device broadcasts inquiry packets on these 32 carrier frequencies.

During the inquiry procedure, the inquiring device or master transmits inquiry messages with the general or dedicated inquiry access code. The timing for inquiry is the same as for paging. The identity or ID packet consists of the inquiry access code (IAC). It has a fixed length of 68 bits. The receiver uses a bit correlator to match the received packet to the known bit sequence of the ID packet. In order to discover other devices a device may enter inquiry substate. In this substate, it may repeatedly transmit the inquiry message (ID packet) at different hop frequencies. The inquiry hop sequence is derived from the Lower Address Part (LAP) of the General Inquiry Access Code (GIAC). Thus, even when dedicated inquiry access codes (DIACs) are used, the applied hopping sequence is generated from the GIAC LAP. A device that allows itself to be discovered, may regularly enter the inquiry scan substate to respond to inquiry messages. During the inquiry substate, the discovering device collects the Bluetooth™ device addresses of all devices that respond to the inquiry message. In addition, the discovering device may also collect extended information (e.g. local name and supported services) from devices that respond with an extended inquiry response packet. It may then, if desired, make a connection to any one of the discovered devices by means of the page procedure described below. The inquiry message broadcast by the source does not contain any information about the source. However, it may indicate which class of devices should respond. There is one general inquiry access code (GIAC) to inquire for any device, and 63 values have been reserved as dedicated inquiry access codes (DIAC) that only inquire for a certain type of device. The inquiry access codes are derived from reserved Bluetooth™ device addresses. There is only one DIAC defined in the Bluetooth™ Specification, and it is called the Limited Inquiry Access Code (LIAC). The LIAC is only intended to be used for limited time periods in scenarios where both devices have been explicitly caused to enter this state, usually by user action.

Inquiry scan is a procedure where a Bluetooth™ device listens for inquiry messages received on its inquiry scan physical channel. A device using one of its inquiry scan channels changes the inquiry channel every 1.28 s until it receives an inquiry message on the current channel from another Bluetooth™ device. This is identified by the appropriate inquiry access code. The inquiry scanning device will then follow the inquiry response procedure to return a response to the inquiring device. The inquiry scan substate is very similar to the page scan substate. However, instead of scanning for the device's device access code, the receiver may scan for the inquiry access code long enough to completely scan for 16 inquiry frequencies. The inquiry procedure uses 32 dedicated inquiry hop frequencies according to the inquiry hopping sequence. These frequencies are determined by the general inquiry address. The phase is determined by the native clock of the device carrying out the inquiry scan. Instead of, or in addition to, the general inquiry access code, the device may scan for one or more dedicated inquiry access codes. However, the scanning may follow the inquiry scan hopping sequence determined by the general inquiry address. The inquiry scan interval shall be less than or equal to 2.56 s.

2. Inquiry Response

An inquiry response packet (frequency hop sequence (FHS)) is transmitted from the inquiry scanning device or slave to the master after the slave has received an inquiry message. This packet contains information necessary for the inquiring master to page the slave and follows 625 microseconds after the receipt of the inquiry message. The inquiry response packet is received by the master at the hop frequency when the inquiry message received by the slave was first in the master-to-slave slot. The slave response substate for inquiries differs completely from the slave response substate applied for pages. When the inquiry message is received in the inquiry scan substate, the recipient may return an inquiry response (FHS) packet containing the recipient's device address (BD_ADDR) and other parameters. If the recipient has non-zero extended inquiry response data to send, it may return an extended inquiry response packet after the FHS packet. On the first inquiry message received in the inquiry scan substate the slave may enter the inquiry response substate. If the slave has non-zero extended inquiry response data to send it may return an FHS packet, with the extended inquiry response bit set to one, to the master 625 microseconds after the inquiry message was received. It may then return an extended inquiry response packet 1250 microseconds after the start of the FHS packet. If the slave's extended inquiry response data is all zeroes the slave may only return an FHS packet with the extended inquiry response bit set to zero.

A contention problem could arise when several devices are in close proximity to the inquiring device or master and all respond to an inquiry message at the same time. However, because every device has a free running clock it is highly unlikely that they all use the same phase of the inquiry hopping sequence. In order to avoid repeated collisions between devices that wake up in the same inquiry hop channel simultaneously, a device will back-off for a random period of time. Thus, if the device receives an inquiry message and returns an FHS packet, it will generate a random number, RAND, between 0 and MAX_RAND. For scanning intervals greater than or equal to 1.28 seconds MAX_RAND will be 1023, however, for scanning intervals less than 1.28 s MAX_RAND may be as small as 127. A profile that uses a DIAC may choose to use a smaller MAX_RAND than 1023 even when the scanning interval is greater than or equal to 1.28 s. The slave will return to the CONNECTION or STANDBY state for the duration of at least RAND time slots. Before returning to the CONNECTION and STANDBY state, the device may go through the page scan substate. After at least RAND slots, the device will add an offset of 1 to the phase in the inquiry hop sequence (the phase has a 1.28 second resolution) and return to the inquiry scan substate again. If the slave is triggered again, it will repeat the procedure using a new RAND. The offset to the clock accumulates each time an FHS packet is returned. During a period when the inquiry device is broadcasting inquiry packets, a slave may respond multiple times, but on different frequencies and at different times. Reserved synchronous slots should have priority over response packets; that is, if a response packet overlaps with a reserved synchronous slot, it will not be sent, but the next inquiry message is awaited. If a device has extended inquiry response data to send, but the extended inquiry response packet overlaps with a reserved synchronous slot, the FHS packet may be sent with the EIR bit set to zero.

The messaging during the inquiry routines is summarized as follows:

In step 1, the master transmits an inquiry message using the inquiry access code and its own clock.

In step 2, the slave responds with the FHS packet containing the slave's Bluetooth™ device address, native clock and other slave information. This FHS packet is returned at times that tend to be random. If the slave has non-zero extended inquiry response data to send it will return an FHS packet with the EIR bit set to one to the master 625 us after the inquiry message was received. It then returns an extended inquiry response packet 1250 us after the start of the FHS packet. FHS is always returned 625 us after inquiry message was received. But, consecutive FHS packets are returned according to this random process. The FHS packet is not acknowledged in the inquiry routine, but it is retransmitted at other times and frequencies as long as the master is probing with inquiry messages.

In step 3, if the slave has non-zero extended inquiry response data, it sends an extended inquiry response packet to the master.

The inquiry response can be received by the inquiring devices within roughly 80 or 640 ms depending on inquiry scan interval of the discovered device. The random backoff for devices using scanning interval <1.28 s is from 0 to 79,375 ms and for other devices from 0 to 639,375 ms. The device using the default inquiry interval is using the latter value range.

In order to collect responses from all devices in the range in an error-free environment, the inquiry substate may have to last for 10.24 s unless the inquirer collects enough responses and aborts the inquiry substate earlier. If desired, the inquirer may also prolong the inquiry substate to increase the probability of receiving all responses in an error-prone environment. In consequence of long inquiry state compared to relatively short backoff times, multiple responses may be received from the single device.

3. Extended Inquiry Response

An Extended Inquiry Response may be used to provide miscellaneous information during the inquiry response procedure. Data types are defined for such things as local name and supported services, information that otherwise would have to be obtained by establishing a connection. A device that receives a local name and a list of supported services in an extended inquiry response does not have to connect to do a remote name request and a service discovery protocol (SDP) service search, thereby shortening the time to useful information. If the slave transmits an extended inquiry response packet, it is transmitted 1250 microseconds after the start of the inquiry response packet. The extended inquiry response packet is received by the master at the hop frequency when the inquiry message received by the slave was first in the master-to-slave slot. The extended inquiry response packet is an Asynchronous Connection-oriented Logical transport (ACL) packet with type DM1, DM3, DM5, DH1, DH3 or DH5. To minimize interference it is recommended to use the shortest packet that is capable of containing the data. The packet is sent on the same frequency as the FHS packet, 1250 microseconds after the start of the FHS packet. In the packet header, LT_ADDR may be set to zero. TYPE may be one of DM1, DM3, DM5, DH1, DH3 or DH5. FLOW, ARQN and SEQN may all be set to zero and ignored during receipt. The HEC LFSR may be initialized with the same DCI (default check initialization) as for the FHS packet. In the payload header, LLID may contain the value 10 (start of an L2CAP message or no fragmentation). FLOW may be set to zero and ignored upon receipt. The length of the payload body (LENGTH) may be smaller than or equal to 240 bytes. The CRC LFSR may be initialized with the same DCI as for the FHS packet. The data whitening LFSR may be initialized with the same value as for the FHS packet. The length of the payload body (LENGTH) may be smaller than or equal to 240 bytes. The CRC LFSR may be initialized with the same DCI as for the FHS packet. The data whitening LFSR may be initialized with the same value as for the FHS packet. The payload data has two parts, a significant part followed by a non-significant part. The significant part contains a sequence of data structures. The non-significant part contains all zero octets. The baseband may not change any octets in the significant part. When transmitting data, the non-significant part octets may be omitted from the payload. A device may store a single extended inquiry response packet. This packet may be used with all IACs.

4. Page

Page is the initial phase of the connection procedure where a device transmits a train of page messages until a response is received from the target device, stopped by the host or a timeout occurs. Page scan is a procedure where a device listens for page messages received on its page scan physical channel. In forming a connection, the paging device will become the master and the page scan device will become the slave in a piconet. Initially, after the slave has received an inquiry message, an inquiry response packet is transmitted from the slave to the master. The inquiry response packet sent from the slave contains information necessary for the inquiring master to page the slave, such as Bluetooth™ device address of the slave device. The necessary information may be received by other means, such as Out-Of-Band pairing. Also the page is not always preceded with inquiry, because the address may be known beforehand (for example saved from previous connections). In the paging procedure, one the Bluetooth™ device that will become the master carries out a page procedure by transmitting page messages in connection request packets to the specified Bluetooth™ slave device that carries out a page scanning procedure to listen for connection request packets from the paging device. A connectable Bluetooth™ device listens for a page request on its page scan channel and, once received, enters into a sequence of exchanges with the paging device. In order for a device to connect to another device, it performs frequency hopping all page scan channel frequencies, sending a page request on each frequency and listening for a response. The page scan channel uses an access code derived from the scanning device's Bluetooth™ device address BD_ADDR to identify communications on the channel. The page scan channel uses a slower hopping rate than the hop rate of the paging device, using the Bluetooth™ device clock of the scanning device as an input. A device listening on its page scan channel remains passive until it receives a page request from another Bluetooth™ device, identified by the page scan channel access code. The two devices will then follow the page procedure to form a connection where the paging device is the master and the page scan device is the slave in a piconet. In order for a paging device to connect to another Bluetooth™ device, it uses the page scan channel of the target device in order to send page requests. If the paging device does not know the phase of the target device's page scan channel, it does not know the current hop frequency of the target device. Therefore, the paging device transmits page requests on each of the page scan hop frequencies and listens for a page response. This is done at a faster hop rate, allowing the paging device to cover all page scan frequencies in a short period of time. The paging device may have some knowledge of the target device's Bluetooth™ clock, such as indicated during a previous inquiry transaction between the two devices, and may be able to predict the phase of the target device's page scan channel. It may use this information to optimize the synchronization of the paging and page scanning process and speed up the formation of the connection.

5. Bluetooth™ RSSI

The received signal strength indicator (RSSI) is a measurement of the power present in a received radio signal. Bluetooth receiver circuits may include an RSSI detector circuit to measure the strength of an incoming signal and generate an output representing the signal strength. For example, the received RF signal may be amplified and downconverted to an intermediate frequency (IF); then channel selection is performed on the IF signal, and the power of the IF signal in the selected channel is measured as the receiver signal strength indicator (RSSI) value. If the Bluetooth receiver circuit supports RSSI, the accuracy may be +/−6 dBm or better.

RSSI Monitoring of Inquiry Response and Extended Inquiry Response Packets

During Bluetooth discovery, before a connection is created, the RSSI is measured from Inquiry Response (FHS) packets when it is received by an inquiring device if enabled by the host.

When the controller receives an Inquiry Response (FHS) without following an Extended Inquiry Response, an HCI Inquiry Result with RSSI event is sent by the controller to the host application, which indicates that a remote Bluetooth device has responded during the current Inquiry process. This event will be sent from the Controller to the Host as soon as an Inquiry Response from a remote device is received. The RSSI parameter is measured during the FHS packet returned by each responding slave.

When the controller receives an Inquiry Response (FHS) following with an Extended Inquiry Response, an HCI Extended Inquiry Result event is sent by the controller to the host application, which indicates that a remote Bluetooth device has responded during the current inquiry process with extended inquiry response data. This event will be sent from the Controller to the Host upon reception of an Extended Inquiry Response from a remote device. One single Extended Inquiry Response is returned per event. This event contains RSSI and inquiry response data for the remote device that responded to the latest inquiry. The RSSI parameter is measured during the FHS packet returned by each responding slave.

RSSI Monitoring of Data Packets Received Over a Connection

After the discovery phase is completed, once a Bluetooth device is connected to another Bluetooth device, the received signal strength indication (RSSI) may be used by a receiving device to monitor the received power level of the data communication packets received over the connection. The RSSI value is calculated from received packet in the Bluetooth physical layer, and may be read by the host application for example through the host controller interface (HCI) Read RSSI command, for example once per second.

The Read RSSI Command will read the value of the received signal strength indication (RSSI) for data communication packets received over the connection to another Bluetooth controller. The RSSI value is referenced with respect to a Connection_Handle that identifies the connection and is assigned when the connection is created. The Connection_Handle is used by the Bluetooth controller to determine which set of buffers to use and the logical link over which the data is to be sent.

Measuring Pathloss with the RSSI and the TX Power Level

The TX Power Level data field in the Extended Inquiry Response packet indicates the transmitted power level of the FHS and EIR packets at the transmitter of the sending device. The TX Power Level data field may be used to calculate path loss of a received packet when the receiving device measures the RSSI of the received FHS packet, using the following equation:

$$pathloss = Tx\ Power\ Level - RSSI\ of\ the\ inquiry\ response\ packet$$

For example, if Tx Power Level=+4 (dBm) and the RSSI on the inquiry response packet is −60 (dBm) then the total pathloss is +4−(−60)=+64 dB. If a second inquiry response packet were received at −40 dBm with a Tx Power Level data=+15 dBm the resulting pathloss would be +55 dB. An application may use these pathloss values to choose which device it thinks might be closer (the one with the lower pathloss value).

Unfortunately, due to fading and varying antenna, circuit, and chip characteristics, these resulting pathloss values may have some uncertainty. Some of the uncertainty (for example, due to fading) may be able to be alleviated if multiple inquiry response packets are received from the same device.

6. Bluetooth™ Host Controller Interface

The Bluetooth™ radio in a device may include the host controller interface that provides a command interface between the host application in the device and the link layer of the Bluetooth™ radio, also referred to as the controller, to enable access to hardware status and control registers of the Bluetooth™ radio.

The host controller interface (HCI) is described in the Bluetooth™ Core Specification. The Host will receive asynchronous notifications of HCI events from Host Controller Transport Layer. HCI events are used for notifying the Host when something occurs. When the Host discovers that an event has occurred, it will then parse the received event packet to determine which event occurred. The commands and events are sent between the Host and the Controller. These are grouped into logical groups by function.

The HCI provides a command interface between the host application in a device and the Bluetooth™ link layer, provides access to hardware status and control registers of the Bluetooth™ radio, and provides a uniform method of accessing the Bluetooth™ baseband capabilities.

Discovery Phase HCI Commands and Events

The device discovery group of commands and events allow a device to discover other devices in the surrounding area. The host controller interface includes the standard HCI Inquiry Result Event logic and HCI Extended Inquiry Result Event logic that recognizes the receipt of the FHS packet and the following EIR packet, respectively. Some of the HCI commands and events for device discovery are described as follows:

Inquiry Command

The HCI Inquiry command will cause the Bluetooth Controller to enter Inquiry Mode to transmit inquiry packets used to discover other nearby Bluetooth devices.

Inquiry Result Event

HCI Inquiry Result Event:

The inquiry result event indicates that a remote device has responded with an inquiry response (IR), i.e. with an FHS packet, during the current inquiry process. This event will be sent from the Bluetooth™ Controller to the Host as soon as an Inquiry Response from a remote device is received. The event parameters in the HCI inquiry result event include BD_ADDR and Class_of_Device of the remote responding device and Clock_Offset OFFSET(A,B) between the responding device and the inquiring device.

Inquiry Result with RSSI Event

The Inquiry Result with RSSI event indicates that a remote Bluetooth device has responded with an inquiry response (FHS) packet during the current Inquiry process. The event reported to the host includes the BD_ADDR address for the device that responded, the Class of Device for the device, the clock offset between the responding device and the receiving device, and the measured RSSI of the received inquiry response packet in units of dB. This is similar to the inquiry result event, but it includes the RSSI value calculated by the controller.

Extended Inquiry Result Event

HCI Extended Inquiry Result Event:

The extended inquiry result event indicates that another Bluetooth™ device has responded during the current inquiry process with extended inquiry response data. Data received in this event will be sent from the device's Controller to the Host upon reception of an EIR from a remote device. One single extended inquiry response is returned per event. The event reported to the host includes the received signal strength indication (RSSI) measurement and inquiry response data for the device that responded to the latest inquiry. The RSSI parameter is measured during the FHS packet returned by each responding device. If an extended inquiry response packet from the same remote device is correctly received in a later response, another event is generated. The Extended_Inquiry_Response data fields are not interpreted by the controller. The standard HCI Extended Inquiry Result Event logic performs the HCI extended inquiry result event procedure to extract the data from the received extended inquiry response packet and to send this data to the host application. The received EIR data extracted from the packet may be passed unaltered to the host application.

Read Inquiry Response Transmit Power Level Command

This command will read the inquiry response Transmit Power level data, expressed in a field of the EIR packet, indicating the power that was used to transmit the FHS and EIR data packets during the discovery phase.

HCI Write Extended Inquiry Response Command

The Write Extended Inquiry Response command writes the extended inquiry response to be sent to an inquiring device during the extended inquiry response procedure. The write extended inquiry response command will write the data that the device's host wishes to send in the extended inquiry response packet during inquiry response. The FEC_Required command parameter states if forward error correction (FEC) encoding is required. The initial value of the inquiry response data is all zero octets. The controller does not interpret the extended inquiry response data, but passes it on to the baseband medium access control and physical radio for transmission in an EIR packet.

Write Inquiry Transmit Power Level Command

The Write Inquiry Transmit Power Level command is used by the transmitting device to write the transmit power level used to transmit the inquiry data packets.

Connection Phase HCI Commands and Events

Read RSSI Command

After the discovery phase is completed, once a Bluetooth device is connected to another Bluetooth device, the received signal strength indication (RSSI) may be used by a receiving device to monitor the received power level of the data communication packets received over the connection. The RSSI value is calculated by the Bluetooth physical layer, and may be read by the host application through the host controller interface (HCI) Read RSSI command.

The Read RSSI command will read the value of the received signal strength indication (RSSI) for data communication packets received over the connection to another Bluetooth controller. The RSSI value is referenced with respect to a Connection_Handle that identifies the connection and is assigned when the connection is created. The Connection_Handle is used by the Bluetooth controller to determine which set of buffers to use and the logical link over which the data is to be sent.

The RSSI parameter in the Read RSSI command is a signed 8-bit value, and is interpreted as an indication of arriving signal strength at the antenna measured in dBm. This command reads the Received Signal Strength Indication (RSSI) value from the Controller. For a Basic Rate/Enhanced Data Rate (BR/EDR) Controller, a Connection_Handle is used as the Handle command parameter and return parameter. The RSSI parameter returns the difference between the measured Received Signal Strength Indication (RSSI) and the limits of the Golden Receive Power Range for a Connection_Handle to another BR/EDR Controller. The Connection_Handle must be a Connection_Handle for an ACL connection. Any positive RSSI value returned by the Controller indicates how many dB the RSSI is above the upper limit, any negative value indicates how many dB the RSSI is below the lower limit. The value zero indicates that the RSSI is inside the 20 dB-wide Golden Receive Power Range. The accuracy of the dB values will depend on the Bluetooth hardware. The only requirements for the hardware are that the BR/EDR Controller is able to tell whether the RSSI is inside, above or below the Golden Device Power Range. The RSSI measurement compares the received signal power with two threshold levels, which define the Golden Receive Power Range. The lower threshold level corresponds to a received power between −56 dBm and 6 dB above the actual sensitivity of the receiver. The upper threshold level is 20 dB above the lower threshold level to an accuracy of +/−6 dB. The meaning of the RSSI metric is an absolute receiver signal strength value in dBm to ±6 dBm accuracy. If the RSSI cannot be read, the RSSI metric is set to 127. (When the Read_RSSI command has completed, a Command Complete event is generated.)

Read Transmit Power Level Command

The Read Transmit Power Level command will read the values for the Transmit Power Level parameter for the specified Connection_Handle for data communication packets during the connection phase, in a range of −30 to +20 dBm.

C. Touch-to-Select in Bluetooth Technology

The Bluetooth Touch-to-select feature employs Received Signal Strength Indication (RSSI) information calculated from the FHS packet, which is used in determining that an inquiry scanning device is within "touch range", i.e. proximate or in close proximity of the inquiring device, and when a threshold for that close proximity is met. This may provide an "intent to share" or "touch to connect" feature.

The inquiring device may measure the signal strength (e.g., RSSI) of each response message from an inquiry scanning device, which may be used in ordering the responding devices. In this manner, the inquiry scanning device with the highest measured signal strength is listed first (e.g., wherein the measured signal strength may correlate to the distance between the inquiring device and the responding inquiry scanning device).

An inquiry scanning device receiving inquiry packets from an inquiring device may respond by transmitting an inquiry response FHS packet or an FHS packet followed by an EIR packet. The host in the inquiring device may recognize EIR events triggered by the responses. The reported EIR events may include RSSI measurement values made by the inquiring device on the received FHS packets. From the RSSI values, the host in the inquiring device may detect when an inquiry scanning device is most likely within "touching range", that is within a distance from the inquiring device that indicates touching-related operations may be executed.

It may also be possible to determine when an inquiry scanning device is moving closer to an inquiring device. The Bluetooth controller in the inquiring device may report the receipt of FHS and/or EIR inquiry responses to its host software stack as an HCI Inquiry Event that may contain the measurement of the RSSI performed on the received response. In instances where EIR responses are received, the Bluetooth controller in the inquiring device may report each received EIR as an HCI Extended Inquiry Result Event. When an inquiry scanning device moves closer to an inquiring device, the Bluetooth controller in the inquiring device may report an RSSI for each inquiry response, thereby enabling the inquiring device to track the changing RSSI levels of the scanning device and thus its relative movement. When the measured RSSI satisfies predetermined response criteria (e.g., including the RSSI being measured to be at or above a predetermined level), the corresponding scanning device may be selected for touch-related operations (e.g., expedited connection establishment).

The Bluetooth controller in an inquiring device reports the receipt of inquiry responses to its host, which also has Touch selection software running. Typical response criteria may include RSSI values measured on the responses, being sensed above certain fixed threshold value, such as −30 dBm. Sensing a response packet having an RSSI of −30 dBm will then cause the Touch selection software in the inquiring device to trigger device selection, while an RSSI of −31 dBm will not. It may also be possible that responding inquiry scanning devices may send Tx power information in EIR packet, since this is an existing feature in the Bluetooth specification v4.0. In instances where Tx power information about the inquiry scanning device is available in the EIR packet, the predetermined response criteria may include an adjustable RSSI threshold value that accounts for variations in the Tx power. For example, the threshold value may be set at 30 dBm below the EIR Tx power, so that if the Tx power level in an FHS packet is +20 dBm then the threshold value that will trigger selection may be the FHS packet being measured at −10 dBm, or dBm below of Tx power level. Secondly, to ensure that devices are maintained in close proximity, the predetermined response criteria may require that more than one EIR must have a sensed RSSI at or above a threshold value. In addition different thresholds may be used for different phases, for example, first the threshold value may be set above −45 dBm to select one or more candidate devices and then a second, more decisive threshold value may be set above −30 dBm.

The detected RSSI may also be a function of: [1] antenna location of the inquiry scanning device sending the signal and [2] antenna location of the inquiring device sensing the signal. The results may be improved if the antennas were brought into close proximity, which may require moving away from obstructions and changing the orientation of one or both devices.

D. Bluetooth Device Discovery Process Enhancement

FIG. 1A is an illustration of an example timing diagram of an example sequence of operations conducted between two mobile wireless devices, according to an example embodiment of the invention. A scanning device 100, shown in FIG. 2A, receives one or more wireless device discovery messages 150 from an inquiring device 102, shown in FIG. 2A. The wireless device discovery messages 150 may be Bluetooth inquiry packets transmitted by the inquiring device 102 in master-to-slave (M-S) slots. Initially, the scanning device 100 scans for wireless device discovery messages with smaller scan windows 22 and larger scan intervals 24. After detecting the first discovery message, the scanning device 100 temporarily tunes its inquiry scanning parameters, for example the inquiry scan interval, the inquiry scan window, or whether to do interlaced/non-interlaced scanning. The scanning device 100, in response to detecting the wireless device discovery message 150, temporarily tunes the device discovery parameters to increase the rate of detecting wireless device discovery messages. The scanning device 100, in response to detecting the wireless device discovery message 150, may tune the device discovery parameters to increase the rate of detecting wireless device discovery messages for a predetermined time period after receipt of the wireless device discovery message 150.

The tuning may be done at the controller or by the host. When tuning with the host, for example, the HCI Write Inquiry Scan Activity command may be used, for example, to control the interval and window sizes. The figure shows that when the scanning device 100 detects one or more device discovery messages 150, scanning device 100 tunes the scanning parameters to increase the scan windows 22', 22", 22'" and reduce the scan intervals 24', 24", 24'". Since the scanning device 100 responds with a response message 158, such as a Bluetooth FHS packet and an optional extended inquiry response packet 160, for each detected device discovery message 150, the tuning of the scanning parameters has the effect of shortening the times 25, 25', 25" between successive response messages 158, increasing the rate of transmitting the response messages 158. Each Bluetooth FHS response message 158 is transmitted by the scanning device 100 in the slave-to-master (S-M) slot following the Bluetooth inquiry packet 150 received from inquiring device 102 in the preceding master-to-slave (M-S) slot.

The figure shows that in response to detecting at "D", the device discovery message 150, the scanning device 100 tunes its scanning parameters to increase scan windows 22 and reduce scan intervals 24. The rate "R" of detecting device discovery messages 150 is increased in response to the scanning device 100 tuning its scanning parameters, resulting in an increased rate of transmitting the response messages 158.

In an example embodiment of the invention, when the scanning device 100 determines that the one or more discovery messages 150 meet a predefined criterion, the scanning device 100 may tune the scanning parameters to shorten the times between successive response messages, thereby increasing the rate of transmitting one or more response messages 158 and 160. The response messages may include information usable for an inquiring device 102 receiving the one or more response messages 158 and 160, to estimate a distance to the scanning device 100, in response to the one or more discovery messages 150 meeting the predefined criterion, in accordance with at least one embodiment of the present invention.

In accordance with an example embodiment of the invention, the predefined criterion may be at least one of a received signal strength indication (RSSI) of the one or more device discovery messages 150 exceeds a threshold value, an interval since a previous increase in the rate of receiving or detecting one or more device discovery messages 150 is greater than a first threshold interval, an interval since receiving or detecting a previous device discovery message 150 is less than a second threshold duration, a predetermined number of previously received or detected one or more device discovery messages 150 is less than a threshold number, and a host control signal based on prescribed conditions or user settings.

In accordance with an example embodiment of the invention, the scanning device 100 increases the rate of receiving or detecting one or more device discovery messages 150 by at least one of reducing an inquiry scan interval, increasing an inquiry scan window, and performing interlaced inquiry scanning In accordance with an example embodiment of the invention, the information in the one or more response messages 158 and 160, usable for the inquiring device 102 receiving the one or more response messages, to estimate a distance to the scanning device 100, includes at least one of a received signal strength indication (RSSI) of the one or more device discovery messages 158 and 160 and an indication that the scanning device 100 and the inquiring device 102 are in close proximity with each other.

In accordance with an example embodiment of the invention, the scanning device 100 may tune the scanning parameters to reduce the scan windows and increase the scan intervals to thereby decrease the rate of receiving or detecting the one or more device discovery messages 150. This mode of tuning to reduce the rate of receiving, may be in response to at least one of a received signal strength indication (RSSI) of the one or more device discovery messages 150 decreases below a threshold value, an interval since a previous increase in the rate of receiving or detecting one or more device discovery messages 150 is less than a first threshold interval, an interval since receiving or detecting a previous device discovery message 150 is greater than a second threshold interval, a predetermined number of previously received or detected one or more device discovery messages 150 is greater than a threshold number, and a host control signal based on prescribed conditions or user settings. In this mode of tuning to reduce the rate of receiving or detecting the one or more device discovery messages 150, since the scanning device 100 responds with a response message 158 for each detected device discovery message 150, the tuning of the scanning parameters in this mode has the effect of lengthening the times between successive response messages 158, decreasing the rate of transmitting the response messages 158.

Figure 1B:
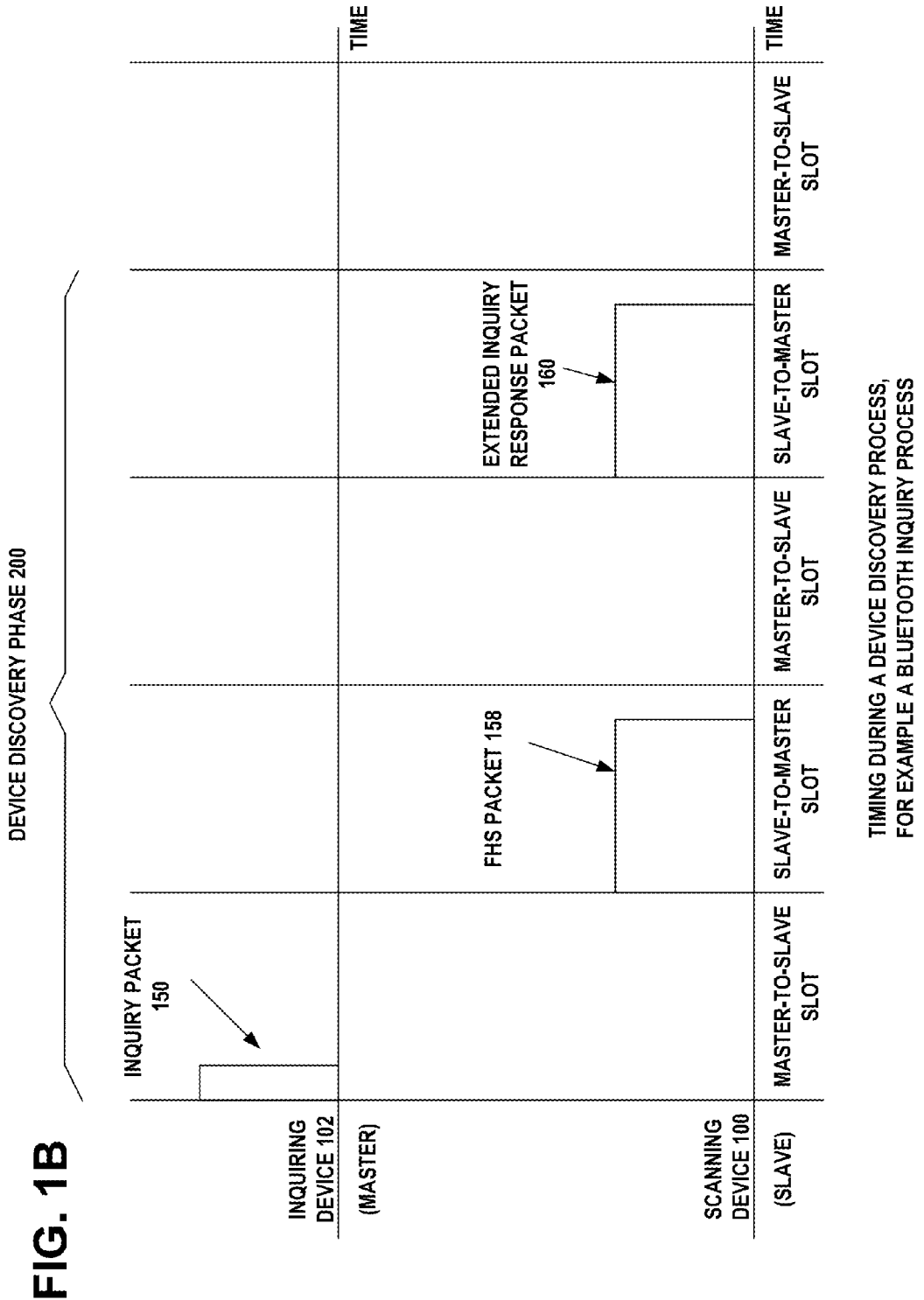
FIG. 1B is an illustration of an example timing diagram of the device discovery process, using the Bluetooth communications standard, in accordance with at least one embodiment of the present invention.

FIG. 1B is an illustration of an example timing diagram of the device discovery process, using the Bluetooth communications standard, in accordance with at least one embodiment of the present invention. The following is one example embodiment applied to Bluetooth technology.

Figure 2A:
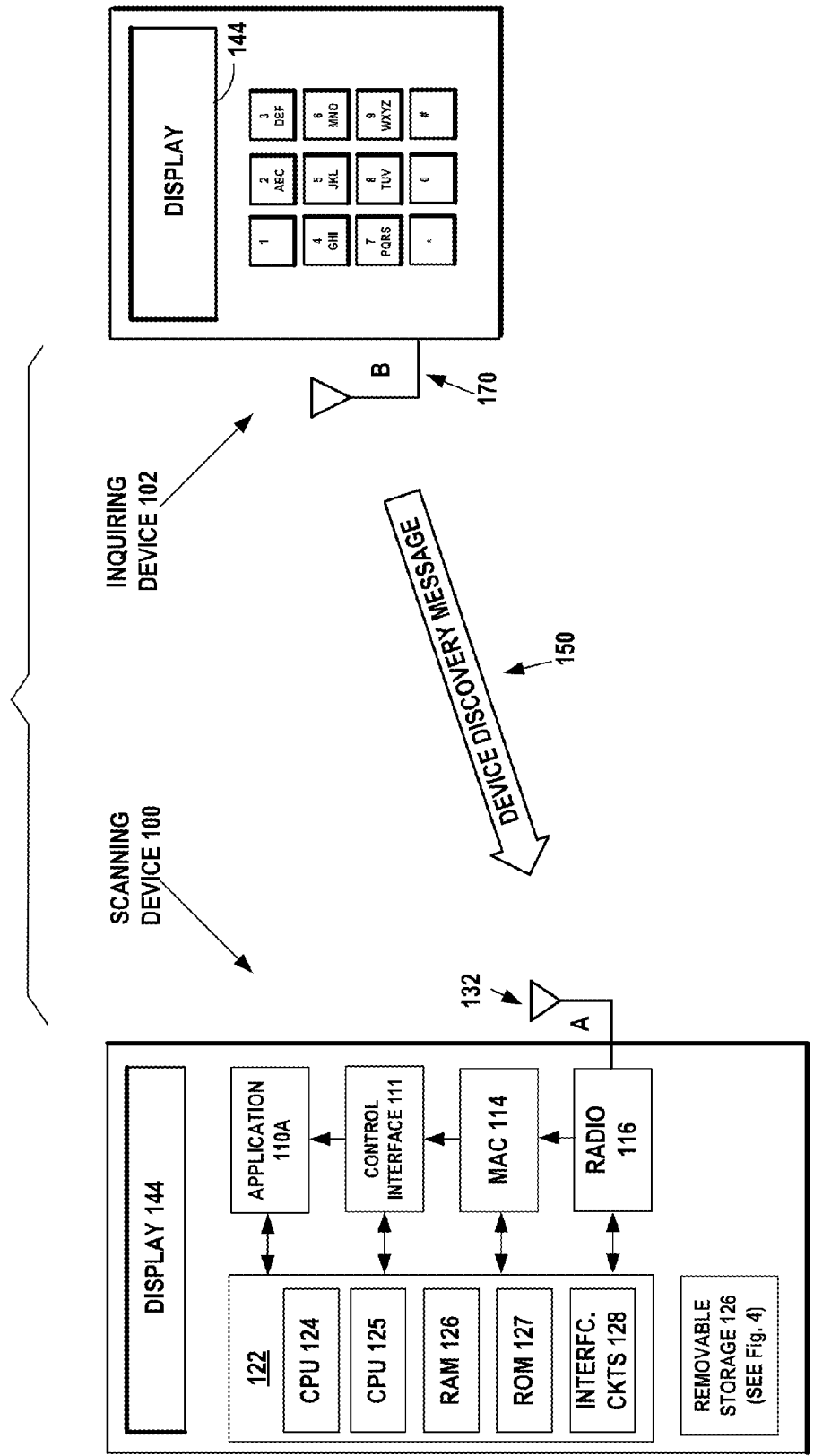
FIG. 2A is an illustration of an example embodiment of a network in a device discovery phase, with a first device, the inquiring device, broadcasting one or more wireless device discovery messages to one or more wireless devices, including a second wireless device, the scanning device, in accordance with at least one embodiment of the present invention.
Figure 2B:
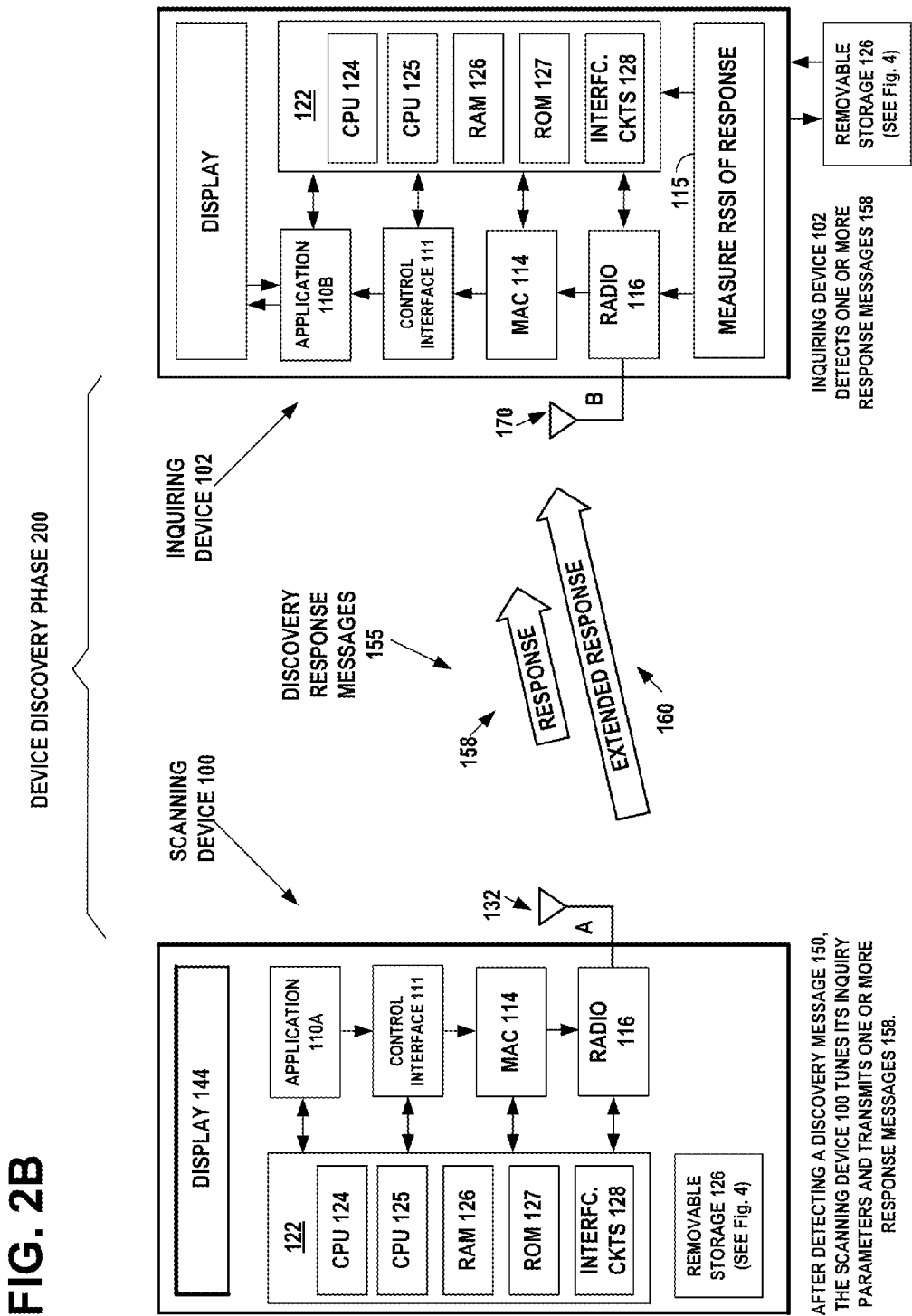
FIG. 2B is an illustration of an example embodiment of the network of FIG. 2A, in the device discovery phase, wherein scanning device receives one or more device discovery messages and in response, the scanning device tunes the scanning parameters, which has the effect of shortening the times between successive response messages, increasing the rate of transmitting the response messages. The response messages include information usable for a wireless device receiving the one or more response messages, to estimate a distance to the scanning device. The inquiring device detects one or more response messages received at the increased rate from the scanning device, which identifies that a touch-to-select event has occurred, in accordance with at least one embodiment of the present invention.

In the Bluetooth specification, during the inquiry procedure, the inquiring device or master device 102 transmits inquiry messages 150 with the general or dedicated inquiry access code. An inquiry response packet (FHS) 158 is transmitted from the inquiry scanning device or slave 100 to the master 102 after the slave has received the inquiry message 150. The device discovery is specified so that the discoverable inquiry scanning device 100 is doing inquiry scan and the inquiring device 102 doing device discovery is in the inquiry state. This means that the inquiring device 102 in inquiry state sends inquiry packets (ID packets) 150, as shown in FIG. 2A, and the discoverable inquiry scanning device 100 scans periodically whether it receives and detects any of the transmitted inquiry packets 150 and responds to those with FHS packets 158, as shown in FIG. 2B. In addition, the discoverable inquiry scanning device 100 may send an Extended Inquiry Response (EIR) packet 160 after the FHS packet 158, as shown in FIG. 1B, to deliver more information about the inquiry scanning device 100. The EIR packet 160 may include for example name of the inquiry scanning device 100 or transmission power.

If the inquiry scanning device 100 transmits an extended inquiry response packet 160, it is transmitted 1250 microseconds after the start of the inquiry response FHS packet 158. The extended inquiry response packet 160 is received by the inquiring device 102 at the hop frequency when the inquiry message received by the inquiry scanning device 100 was first in the master-to-slave slot. The extended inquiry response packet is an Asynchronous Connection-oriented Logical transport (ACL) packet with type DM1, DM3, DM5, DH1, DH3 or DH5.

FIG. 2A is an illustration of an example embodiment of a network in a device discovery phase, with a first device, the inquiring device 102, broadcasting one or more wireless device discovery messages 150 to one or more wireless devices, including a second wireless device, the scanning device 100, in accordance with at least one embodiment of the present invention. The figure shows an example embodiment of the network in the device discovery phase 200, with the first device 102 broadcasting one or more wireless device discovery messages 150 to one or more wireless devices, including the second wireless device 100, in accordance with at least one embodiment of the present invention. The following is one example embodiment applied to Bluetooth technology.

In an example embodiment of the invention, the example network includes a first Bluetooth™ inquiring device 102 broadcasting one or more inquiry packets 150 to one or more inquiry scanning devices, including a second Bluetooth™ inquiry scanning device 100, in accordance with at least one embodiment of the present invention. In embodiments of the invention, the inquiry scanning device 100 and the inquiring device 102 (shown in FIG. 2B) include a processor 122 that includes from one to many central processing units (CPUs) 124 and 125, a random access memory (RAM) 126, a read only memory (ROM) 127, and interface circuits 128 to interface with one or more radio transceivers 116, battery or house power sources, keyboard, display 144, etc. The RAM and ROM can be removable memory devices such as smart cards, SIMs, WIMs, semiconductor memories such as RAM, ROM, PROMS, flash memory devices, etc.

The Bluetooth™ inquiry scanning device 100 and the inquiring device 102 (shown in FIG. 2B) include the host controller interface (HCI) 111 that provides a command interface between the host application 110B in the device and the link layer or MAC 114 and the radio 116, also referred to as the controller, to enable access to hardware status and control registers of the Bluetooth™ radio 116. The host controller interface (HCI) is described in the Bluetooth™ Core Specification. The Host application 110B will receive asynchronous notifications of HCI events from HCI 111. HCI events are used for notifying the Host application 110B when something occurs. When the Host application discovers that an event has occurred, it will then parse the received event packet to determine which event occurred. The commands and events are sent between the Host application 110B and the radio 116. The HCI 111 provides a command interface between the host application 110B in a device and the Bluetooth™ link layer or MAC 114, provides access to hardware status and control registers of the radio 116, and provides a uniform method of accessing the Bluetooth™ baseband capabilities.

The processor 122 in the inquiring device 102 (shown in FIG. 2B) outputs data to the Bluetooth™ MAC 114 that packages the data into Bluetooth™ protocol data units (PDU) or packets, such as inquiry packets 150, that are input to the Bluetooth™ PHY radio 116 for normal Bluetooth™ transmission. During normal Bluetooth™ transmission, the RF signal from the radio 116 is directed to the antenna B 170 for transmission.

Inquiry scanning device 100 and inquiring device 102 may be, for example, a miniature device such as a key fob, smart card, jewelry, or the like. Inquiry scanning device 100 and inquiring device 102 may be, for example, a relatively larger cell phone, smart phone, flip-phone, PDA, graphic pad, or even larger devices such as a laptop computer, desktop computer, kitchen appliance, such as a refrigerator, an automobile dashboard, and the like. In embodiments, the relative sizes of devices 100 and 102 may be arbitrary, either one of the devices may be either mobile or fixed-base.

FIG. 2B is an illustration of an example embodiment of the network of FIG. 2A, in the device discovery phase, wherein scanning device 100 receives and detects one or more device discovery messages 150 and determines that the one or more discovery messages 150 meet a predefined criterion. In an example embodiment of the invention, when the scanning device 100 determines that the one or more discovery messages 150 meet a predefined criterion, the scanning device 100 may tune the scanning parameters to shorten the times between successive response messages, thereby increasing the rate of transmitting one or more response messages 158 and 160. In response, the scanning device 100 increases a rate of transmitting one or more response messages 158 and 160 including information usable for the inquiring device 102 receiving the one or more response messages 158 and 160 to estimate a distance to the scanning device 100, in response to the one or more discovery messages 150 meeting the predefined criterion. The inquiring device 102 detects one or more response messages 158 and 160 received at the increased rate from the scanning device 100, which identifies that a touch-to-select event 20 has occurred, in accordance with at least one embodiment of the present invention.

The figure shows the device discovery phase 200, wherein the first device 102 has received from the second wireless device 100 one or more wireless response messages 158 and 160, responding to the discovery messages 150. The first device 102 measures the power level of the wireless response messages 158. The first device 102 selects the second device 100, if the one or more wireless response messages 158 received from the second wireless device 100 has a measured power level greater than a threshold value. The first device 102 may then establish a wireless communication connection 176 (shown in FIG. 2C) with the second device 100, in accordance with at least one embodiment of the present invention. The following is one example embodiment applied to Bluetooth technology.

In an example embodiment of the invention, the second Bluetooth™ device, the inquiry scanning device 100, transmits one or more response messages including a response packet, such as an inquiry response FHS packet 158 and an inquiry response with an extended inquiry response (EIR) packet 160, in response to the inquiry packet 150, in accordance with at least one embodiment of the present invention.

In an example embodiment of the invention, an RSSI value may be measured by the inquiring device 102, for the inquiry response FHS packet 158. The RSSI is measured for the FHS packet, whether or not the EIR packet is present. When there is an EIR packet, it is accompanied by a preceding FHS packet that is measured for its RSSI.

The received signal strength indicator (RSSI) is a measurement of the power present in the inquiry response FHS packet 158 radio signal. Bluetooth receiver circuits 116 include an RSSI detector circuit 115 to measure the strength of an incoming signal and generate an output representing the signal strength. For example, the received RF signal may be amplified and down-converted to an intermediate frequency (IF); then channel selection is performed on the IF signal, and the power of the IF signal in the selected channel is measured as the receiver signal strength indicator (RSSI) value. with a required accuracy +/−6 dBm.

During Bluetooth discovery, before a connection is created, the RSSI is measured for Inquiry Response (FHS) packet when it is received by the inquiring device 102. When the radio 116 receives an Inquiry Response (FHS) packet 158 with EIR bit set to zero, an HCI Inquiry Result with RSSI event is sent by the radio 116 to the host application 110B, which indicates that a remote Bluetooth device 100 has responded during the current Inquiry process. This event will be sent from the radio 116 to the Host application 110B as soon as an Inquiry Response 158 from a remote device 100 is received. The RSSI parameter is measured during the receipt of the FHS packet 158.

When the radio 116 receives an Extended Inquiry Response 160, an HCI Extended Inquiry Result event is sent by the radio 116 to the host application 110B, which indicates that a remote Bluetooth device 100 has responded during the current inquiry process with extended inquiry response data. This event will be sent from the radio 116 to the Host application 110B upon reception of an Extended Inquiry Response 160 from a remote device 100. One single Extended Inquiry Response 160 is returned per event. This event contains RSSI and inquiry response data for the remote device 100 that responded to the latest inquiry 150. The RSSI parameter is measured during the receipt of the FHS packet 158.

The inquiring device may use the RSSI of the response message 158 from an inquiry scanning device 100, in ordering the responding devices. In this manner, the inquiry scanning device with the highest measured signal strength may be listed first. For example, the measured signal strength may correlate with the distance between the inquiring device and the responding inquiry scanning device.

From the RSSI values, the host in the inquiring device may detect when an inquiry scanning device is most likely within "touching range", that is within a distance from the inquiring device that indicates touching-related operations may be executed.

It may also be possible to determine when an inquiry scanning device 100 is moving closer to an inquiring device 102. The Bluetooth radio 116 in the inquiring device may report the receipt of FHS and/or EIR inquiry responses to the host application as an HCI Inquiry Event that may contain the measurement of the RSSI performed on the received response 158. In instances where EIR responses 160 are received, the Bluetooth radio 116 in the inquiring device 102 may report each received EIR as an HCI Extended Inquiry Result Event. When an inquiry scanning device 100 moves closer to an inquiring device 102, the Bluetooth radio 116 in the inquiring device 102 may report an RSSI for each EIR response 160, thereby enabling the inquiring device 102 to track the changing RSSI levels of the inquiry scanning device 100 and thus its relative movement. When the measured RSSI satisfies predetermined response criterion, such as a threshold value, the corresponding inquiry scanning device 100 may be selected for touch-related operations, such as expedited connection establishment. In the case of an EIR packet that does not follow the FHS packet (EIR bit set to zero): Inquiry Result Event. In case of an EIR packet that does follow the FHS packet: Extended Inquiry Result Event. There is only one event per FHS packet and the type depends on whether the EIR bit is set to zero or one (EIR packet follows the FHS packet). The latter event is typically reported each time an FHS is received with the EIR bit set to one. The former is typically reported only once per inquiry process.

The Bluetooth radio 116 in the inquiring device 102 reports the receipt of inquiry responses 158 to its host application 110B, which also has Touch selection software running. Typical response criteria may include RSSI values measured on the response 158, being sensed above certain fixed threshold value, such as −30 dBm. Sensing a response packet having an RSSI of −30 dBm will then cause the Touch selection software in the host application of inquiring device 102 to trigger device selection, while an RSSI of −31 dBm will not. It may also be possible that responding inquiry scanning devices 100 may send Tx power information in EIR packet 160, since this is an existing feature in the Bluetooth specification v4.0. In instances where Tx power information about the inquiry scanning device 100 is available in the EIR packet 160, the predetermined response criteria may include an adjustable RSSI threshold value that accounts for variations in the Tx power of the inquiry scanning device 100. For example, the threshold value may be set at 30 dBm below the EIR Tx power, so that if the Tx power level of an FHS packet 158 is +20 dBm, then the threshold value that will trigger selection may be the FHS packet 158 being measured at −10 dBm, or 30 dBm below of Tx power level. Secondly, to ensure that devices 100 and 102 are maintained in close proximity, the predetermined response criteria may require that more than one FHS 158 have a sensed RSSI at or above a threshold value. In addition, different thresholds may be used for different phases, for example, first the threshold value may be set above −45 dBm to select one or more candidate devices 100 and then a second, more decisive threshold value may be set above −30 dBm.

The detected RSSI may also be a function of: [1] antenna location of the inquiry scanning device 100 sending the signal and [2] antenna location of the inquiring device 102 sensing the signal. The results may be improved if the antennas were brought into close proximity, which may require moving away from obstructions and changing the orientation of one or both devices.

FIG. 2C is an illustration of an example embodiment of the network of FIG. 2B, wherein the occurrence of the touch-to-select event 20 results in the two devices 100 and 102 establishing a connection, in accordance with at least one embodiment of the present invention. The figure shows an example embodiment of the network of FIG. 2B, in the connection phase 220 after the discovery phase 200 has been completed and the wireless communication has been established. In the Bluetooth communications protocol, a communication connection 176 is formed as a piconet, with the inquiry scanning device 100 becoming the slave device 100 and the inquiring device 102 becoming the master device 102 in the piconet.

Figure 3A:
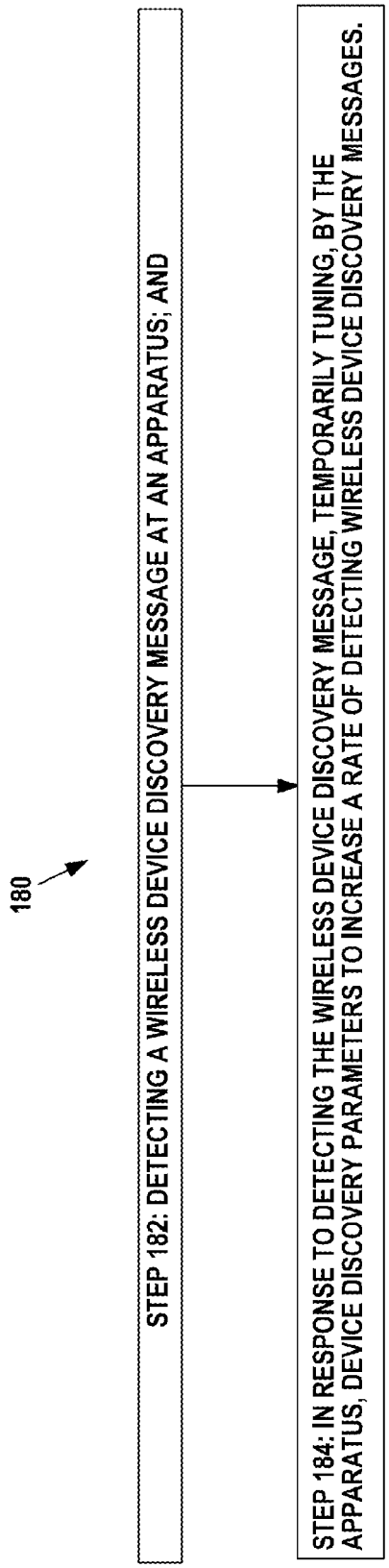
FIG. 3A is an illustration of an example flow diagram of an example process in the scanning device 100 carrying out the example operations in the device discovery phase shown in FIG. 1A, in accordance with at least one embodiment of the present invention.

FIG. 3A is an illustration of an example flow diagram of an example process in the scanning device 100 carrying out the example operations in the device discovery phase shown in FIG. 1A, in accordance with at least one embodiment of the present invention. The figure shows an example embodiment of the invention, of the example process in the scanning device 100 in accordance with at least one embodiment of the present invention. The steps of the flow diagram 180 represent computer code instructions stored in the RAM and/or ROM memory of the device 100, which when executed by the central processing units (CPU) 124 and/or 125, carry out the functions of the example embodiments of the invention. The steps may be carried out in another order than shown and individual steps may be combined or separated into component steps. The flow diagram has the following steps:

Step 182: detecting a wireless device discovery message at an apparatus; and

Step 184: in response to detecting the wireless device discovery message, temporarily tuning, by the apparatus, device discovery parameters to increase a rate of detecting wireless device discovery messages.

FIG. 3B is an illustration of an example flow diagram of an example implementation of the process in the inquiring device 102, carrying out the example operations in the device discovery phase, in accordance with at least one embodiment of the present invention. The figure shows an example embodiment of the invention, of the example process in the inquiring device 102 in accordance with at least one embodiment of the present invention. The steps of the flow diagram 190 represent computer code instructions stored in the RAM and/or ROM memory of the device 102, which when executed by the central processing units (CPU) 124 and/or 125, carry out the functions of the example embodiments of the invention. The steps may be carried out in another order than shown and individual steps may be combined or separated into component steps. The flow diagram has the following steps:

Step 192: transmitting, by an apparatus, wireless signals comprising one or more device discovery messages;

Step 194: receiving, by the apparatus, one or more response messages from a wireless device, including information usable by the apparatus to estimate a distance to the wireless device, the one or more response messages being received at an increased rate; and Step 196: estimating, by the apparatus, a distance to the wireless device using the information usable for estimating the distance to the wireless device included in the one or more response messages, the estimation being carried out rapidly based on the increased rate of receipt of the one or more response messages.

FIG. 3C is an illustration of an example message format for device discovery messages 150, using the Bluetooth communications standard, in accordance with at least one embodiment of the present invention. During the inquiry procedure, the inquiring device 102 or master transmits inquiry messages 150 with the general or dedicated inquiry access code. The identity or ID packet consists of the inquiry access code (IAC). It has a fixed length of 68 bits. In order to discover other devices the inquiring device 102 may enter inquiry substate where it may repeatedly transmits the inquiry message (ID packet) at different hop frequencies. The inquiry hop sequence is derived from the Lower Address Part (LAP) of the General Inquiry Access Code (GIAC).

FIG. 3D is an illustration of an example message format for inquiry response messages 158, using the Bluetooth communications standard, in accordance with at least one embodiment of the present invention. An inquiry response packet (FHS) 158 is transmitted from the inquiry scanning device 100 or slave to the master after the slave has received an inquiry message 150. The inquiry response packet 158 contains information necessary for the inquiring device 102 to page the slave and follows 625 microseconds after the receipt of the inquiry message 150. The inquiry response packet 158 is received by the inquiring device 102 at the hop frequency when the inquiry message 150 received by the slave was first in the master-to-slave slot. When the inquiry message 150 is received in the inquiry scan substate, the inquiry scanning device 100 may return an inquiry response (FHS) packet 158 containing the recipient's device address (BD_ADDR) and other parameters. If the recipient has non-zero extended inquiry response data to send, it indicates this by the EIR bit 159, indicating that it will return an extended inquiry response packet 160 after the FHS packet 158. On the first inquiry message received in the inquiry scan substate the slave may enter the inquiry response substate. If the slave has non-zero extended inquiry response data to send it may return an FHS packet, with the extended inquiry response bit set to one, to the master 625 microseconds after the inquiry message was received. It may then return an extended inquiry response packet 1250 microseconds after the start of the FHS packet. If the slave's extended inquiry response data is all zeroes the slave may only return an FHS packet with the extended inquiry response bit 159 set to zero.

FIG. 3E is an illustration of an example message format for extended discovery response messages 160, using the Bluetooth communications standard, in accordance with at least one embodiment of the present invention. An Extended Inquiry Response 160 may be used to provide miscellaneous information during the inquiry response procedure. Data types are defined for such things as local name and supported services, information that otherwise would have to be obtained by establishing a connection. The inquiring device 102 that receives a local name and a list of supported services in an extended inquiry response does not have to connect to do a remote name request and a service discovery protocol (SDP) service search, thereby shortening the time to useful information. If the inquiry scanning device 100 transmits an extended inquiry response packet 160, it is transmitted 1250 microseconds after the start of the inquiry response packet 158. The extended inquiry response packet 160 is received by the inquiring device 102 at the hop frequency when the inquiry message 150 received by the inquiry scanning device 100 was first in the master-to-slave slot.

FIG. 3F is an illustration of an example message format for communication connection messages 175, using the Bluetooth communications standard, in accordance with at least one embodiment of the present invention. The standard frame format for Bluetooth systems is illustrated in the figure, which shows the packet contents of the Bluetooth frame. The function of the access code is to identify the packets exchanged within a piconet, where each piconet has a unique access code. The access code is used to synchronize the slaves in a piconet to its master. The main function of the header of the Bluetooth packet is to determine an individual slave address in the piconet by the Logical Transport-Address (LT ADDR). The last part of the Bluetooth frame is the payload. Bluetooth has several types of packets. Asynchronous Connectionless Communications (ACL) packet payload may be one of two types; medium data rate packets and, high data rate packets.

In existing Bluetooth device discovery schemes for touch-to-select (T2S) use cases, there is only one correctly received response for device identification. The number of responses is limited to mainly cover packet collision and packet corruptions. The time difference between two adjacent packets received in an error free environment may be greater than five seconds for an existing touch-to-select operation. In accordance with an example embodiment of the invention, the Bluetooth controller of the scanning device 100 may be tuned to adjust it's inquiry scanning state so that, at least, it is based on whether or not an inquiry packet 150 is received. In this manner, an inquiring device 102 may more quickly receive an inquiry response because more responses are received.

In accordance with an example embodiment of the invention, the implementation includes detection of the inquiry. This may be, for example, based on the received inquiry (ID) packet 150 or by sending the FHS packet 158 or the EIR packet 160. After detecting the inquiry, the scanning device 100 tunes its inquiry scanning parameters, such as inquiry scan interval, inquiry scan window or whether to do interlaced/non-interlaced scan. The functionality may be implemented into the Bluetooth controller, thus making it most power efficient, or alternately by delivering the inquiry detection occurrence (probably with some conditions) to the host of the scanning device 100 and let the host decide whether to change the inquiry scanning parameters.

In accordance with an example embodiment of the invention, the tuning of the scanning device 100 inquiry scanning parameters may have additional rules, such as:
  RSSI of the ID packet exceeds the threshold (only near device)
  Controlled by host (host may have own conditions such as only when backlight on or activate by the user from settings)
  Inquiry parameters are already good enough
  When the last tuning was made In accordance with an example embodiment of the invention, similarly the end of tuning of the scanning device 100 inquiry scanning parameters may have several conditions:
  No inquiry received during last x number of inquiry intervals
  Number of sent packets
  Time from the start of the tuning In accordance with an example embodiment of the invention, the enhanced inquiry scan operation of the Bluetooth controller in the scanning device 100, may controlled by the host via HCI interface, by defining new command, editing existing commands or using vendor specific commands.

It is common that the standard Bluetooth inquiry scan in the mobile devices uses following default values
  Inquiry scan interval=2.56 s
  Inquiry scan window=11.25 ms
  Inquiry scan type=Standard scan This means that due to the standard Bluetooth scanning, the scanning device 100 has only roughly 50% chance to receive inquiry packet 150 from inquiring device 102 during the single scan window, due to inquiring device 102 possibly being on a different FHS sequence than the scanning device 100 (the inquiry hopping sequence is divided over two inquiring FHS sequences A and B of 16 frequencies). However, it is very likely (but not 100%) that in error-free environment, the inquiry packet 150 is received during next scan interval. Thus, typically, most of the devices are found within 5.12 s. Then the standard Bluetooth inquiry scanning device 100 will return to the inquiry scan after 0 to 639,375 ms and responds to inquiry packets until the devices go into different FHS sequences. Then the next inquiry packet 150 is most likely found in the following scan, i.e. after 2.56 s from the last trial.

As a consequence, the standard Bluetooth first inquiry response 158 is received, most likely, within 5.12 s, and then likely few inquiry responses are received with interval of roughly 5 m to 645 ms until FHS sequence switch happens. The next response 158 is then received after 2.56 s from last inquiry scan event. Thus, there is typically 2.56 s (+0 to 639,375 ms) pauses in receiving responses. It is not rare that there are pauses that are multiple of 2.56 s such as 5.12 s or sometime even higher.

In an example embodiment of the invention, the Inquiry scan type is changed to interlaced scan after receiving the first inquiry packet and in addition the scan interval may also be decreased for example to 1.28 s. In the error free environment packets after first response are sent roughly with interval of 5 to 645 ms and in case of error the pause typically is at maximum of 1.28 s (+0 to 639,375 ms). Multiples of 1.28 s pauses are present only due to collisions or some other error, not due to protocol constraints like in standard scan.

In an example embodiment of the invention, the first inquiry response 158 is received most likely within 5.12 s, and then likely many inquiry responses 158 are received with interval of roughly 5 m to 645 ms. If there is a collision or some other errors, the next response 158 is then received after 1.28 s from last inquiry scan event. Thus, long pauses in receiving inquiry responses 158 are eliminated and system works much faster in touch-to-select use cases.

Figure 4:
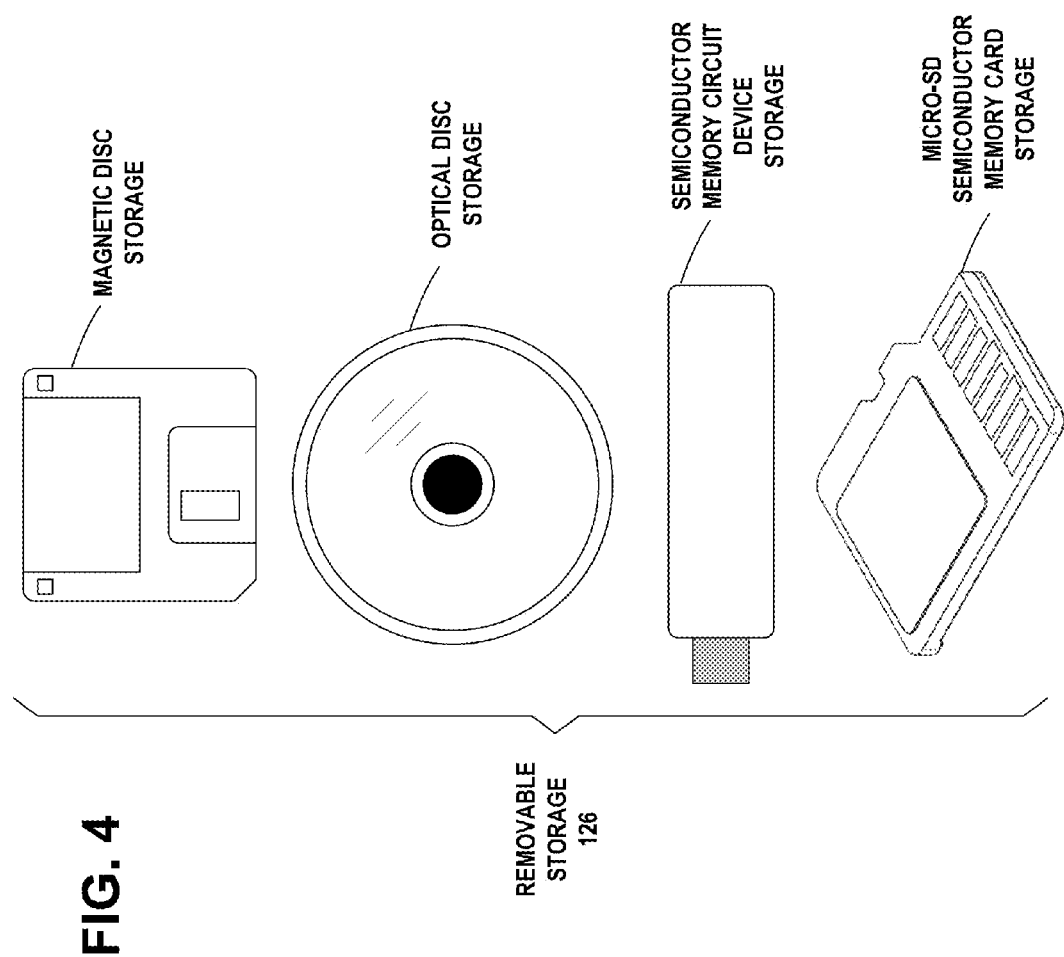
FIG. 4 illustrates an example embodiment of the invention, wherein examples of removable storage media are shown, based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with at least one embodiment of the present invention.

FIG. 4 illustrates an example embodiment of the invention, wherein examples of removable storage media 126 are shown, based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with at least one embodiment of the present invention.

Using the description provided herein, the embodiments may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable medium.

As indicated above, memory/storage devices include, but are not limited to, disks, optical disks, removable memory devices such as smart cards, SIMs, WIMs, semiconductor memories such as RAM, ROM, PROMS, etc. Transmitting mediums include, but are not limited to, transmissions via wireless communication networks, the Internet, intranets, telephone/modem-based network communication, hard-wired/cabled communication network, satellite communication, and other stationary or mobile network systems/communication links.

Although specific example embodiments have been disclosed, a person skilled in the art will understand that changes can be made to the specific example embodiments without departing from the spirit and scope of the invention.

What is claimed is:

1. A method, comprising:
    detecting a wireless device discovery message at an apparatus; and
    in response to detecting the wireless device discovery message, temporarily tuning, by the apparatus, device discovery parameters to increase a rate of detecting wireless device discovery messages;
    wherein the apparatus tunes the device discovery parameters to increase the rate of detecting wireless device discovery messages by at least one of reducing an inquiry scan interval, increasing an inquiry scan window duration, and performing interlaced inquiry scanning.

2. The method of claim 1, further comprising:
    determining, by the apparatus, that the wireless device discovery message meets a predefined criterion to temporarily tune the device discovery parameters to increase the rate of detecting wireless device discovery messages;
    wherein the predefined criterion comprises at least one of a received signal strength indication of the wireless device discovery message exceeding a threshold value, an interval since a previous increase in the rate of detecting a wireless device discovery message is greater than a first threshold interval, an interval since detecting a previous wireless device discovery message is less than a second threshold duration, and a predetermined number of previously detected one or more wireless device discovery messages is less than a threshold number.

3. The method of claim 1, wherein the apparatus tunes the device discovery parameters to increase the rate of detecting wireless device discovery messages for a predetermined time period after receipt of the wireless device discovery message.

4. The method of claim 1, further comprising:
    transmitting, by the apparatus, in response to detecting the wireless device discovery message, one or more wireless response messages usable for a wireless device receiving the one or more wireless response messages, to estimate a distance to the apparatus, the one or more wireless response messages including at least one of a received signal strength indication of the wireless device discovery message and an indication that the apparatus and the wireless device are in close proximity with each other.

5. The method of claim 1, further comprising:
    decreasing, by the apparatus, the rate of detecting the wireless device discovery messages in response to at least one of a received signal strength indication of the wireless device discovery message decreases below a threshold value, an interval since a previous increase in the rate of detecting wireless device discovery messages is less than a first threshold interval, an interval since detecting a previous wireless device discovery message is greater than a second threshold interval, and a predetermined number of previously detected wireless device discovery messages is greater than a threshold number.

6. An apparatus, comprising:
    at least one processor;
    at least one memory including computer program code;
    the at least one memory and the computer program code configured to, with the at least one processor, cause the apparatus at least to:
    detect a wireless device discovery message; and
    in response to detecting the wireless device discovery message, temporarily tune device discovery parameters to increase a rate of detecting wireless device discovery messages;
    wherein the apparatus tunes the device discovery parameters to increase the rate of detecting wireless device discovery messages by at least one of reducing an inquiry scan interval, increasing an inquiry scan window duration, and performing interlaced inquiry scanning.

7. The apparatus of claim 6, further comprising:
    the at least one memory and the computer program code configured to, with the at least one processor, cause the apparatus at least to:
    determine that the wireless device discovery message meets a predefined criterion to temporarily tune the device discovery parameters to increase the rate of detecting wireless device discovery messages;
    wherein the predefined criterion comprises at least one of a received signal strength indication of the wireless device discovery message exceeding a threshold value, an interval since a previous increase in the rate of detecting a wireless device discovery message is greater than a first threshold interval, an interval since detecting a previous wireless device discovery message is less than a second threshold duration, and a predetermined number of previously detected one or more wireless device discovery messages is less than a threshold number.

8. The apparatus of claim 6, wherein the apparatus tunes the device discovery parameters to increase the rate of detecting wireless device discovery messages for a predetermined time period after receipt of the wireless device discovery message.

9. The apparatus of claim 6, further comprising:
    the at least one memory and the computer program code configured to, with the at least one processor, cause the apparatus at least to:
    transmit, in response to detecting the wireless device discovery message, one or more wireless response messages usable for a wireless device receiving the one or more wireless response messages, to estimate a distance to the apparatus, the one or more wireless response messages including at least one of a received signal strength indication of the wireless device discovery message and an indication that the apparatus and the wireless device are in close proximity with each other.

10. The apparatus of claim 6, further comprising:
the at least one memory and the computer program code configured to, with the at least one processor, cause the apparatus at least to:
decrease the rate of detecting the wireless device discovery messages in response to at least one of a received signal strength indication of the wireless device discovery message decreases below a threshold value, an interval since a previous increase in the rate of detecting wireless device discovery messages is less than a first threshold interval, an interval since detecting a previous wireless device discovery message is greater than a second threshold interval, and a predetermined number of previously detected wireless device discovery messages is greater than a threshold number.

11. A computer program product comprising computer executable program code recorded on a computer readable, non-transitory storage medium, the computer executable program code comprising:
code for detecting a wireless device discovery message at an apparatus; and
code for, in response to detecting the wireless device discovery message, temporarily tuning, by the apparatus, device discovery parameters to increase a rate of detecting wireless device discovery messages;
wherein the apparatus tunes the device discovery parameters to increase the rate of detecting wireless device discovery messages by at least one of reducing an inquiry scan interval, increasing an inquiry scan window duration, and performing interlaced inquiry scanning.

12. The computer program product of claim 11, further comprising:
code for determining, by the apparatus, that the wireless device discovery message meets a predefined criterion to temporarily tune the device discovery parameters to increase the rate of detecting wireless device discovery messages;
wherein the predefined criterion comprises at least one of a received signal strength indication of the wireless device discovery message exceeding a threshold value, an interval since a previous increase in the rate of detecting a wireless device discovery message is greater than a first threshold interval, an interval since detecting a previous wireless device discovery message is less than a second threshold duration, and a predetermined number of previously detected one or more wireless device discovery messages is less than a threshold number.

13. The computer program product of claim 11, wherein the apparatus tunes the device discovery parameters to increase the rate of detecting wireless device discovery messages for a predetermined time period after receipt of the wireless device discovery message.

14. The computer program product of claim 11, further comprising:
code for transmitting, by the apparatus, in response to detecting the wireless device discovery message, one or more wireless response messages usable for a wireless device receiving the one or more wireless response messages, to estimate a distance to the apparatus, the one or more wireless response messages including at least one of a received signal strength indication of the wireless device discovery message and an indication that the apparatus and the wireless device are in close proximity with each other.

15. The computer program product of claim 11, further comprising:
code for decreasing, by the apparatus, the rate of detecting the wireless device discovery messages in response to at least one of a received signal strength indication of the wireless device discovery message decreases below a threshold value, an interval since a previous increase in the rate of detecting wireless device discovery messages is less than a first threshold interval, an interval since detecting a previous wireless device discovery message is greater than a second threshold interval, and a predetermined number of previously detected wireless device discovery messages is greater than a threshold number.

* * * * *